Patented Mar. 7, 1933

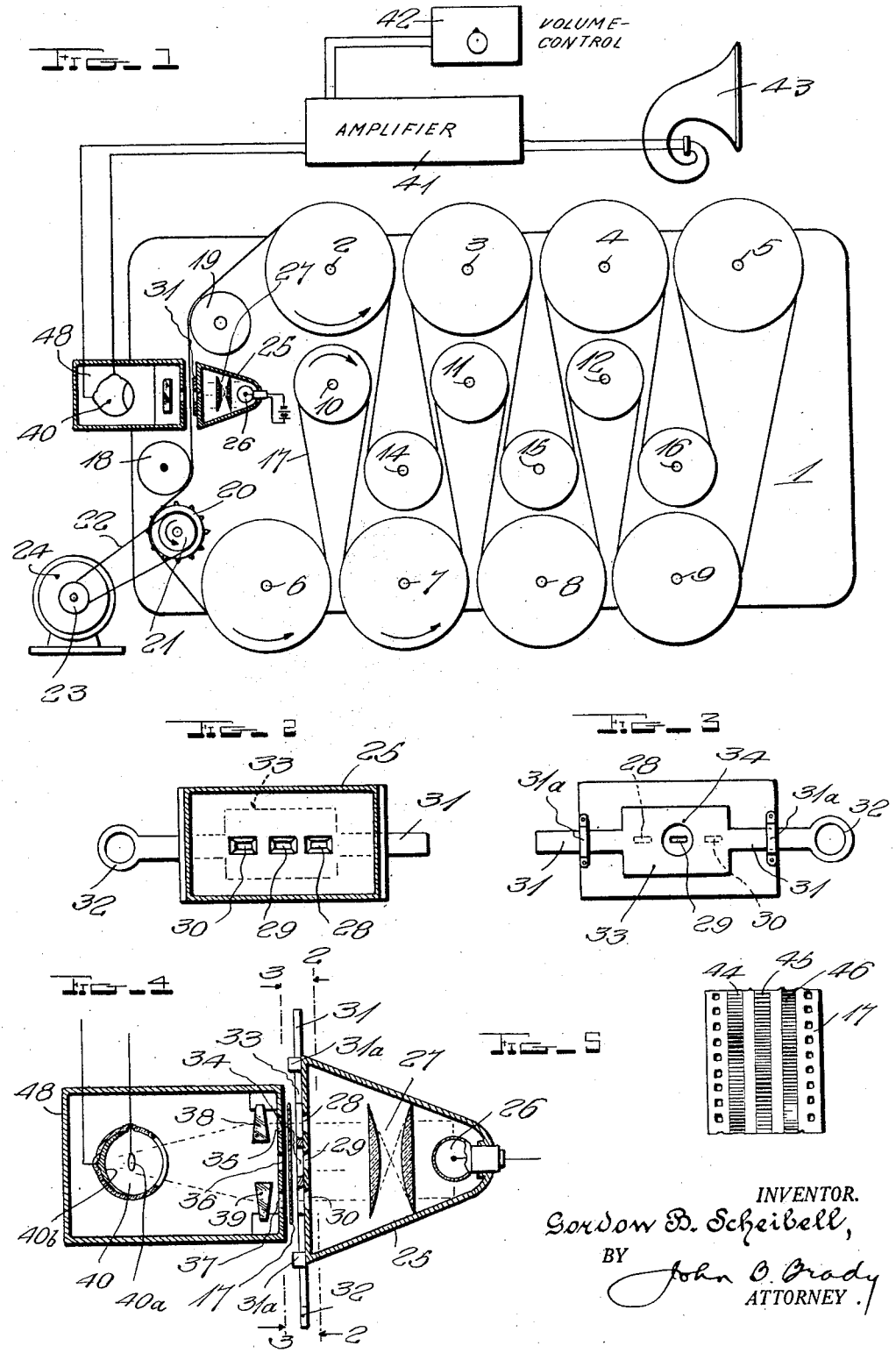

1,900,738

UNITED STATES PATENT OFFICE

GORDON BROWN SCHEIBELL, OF NEWARK, NEW JERSEY

FILM APPARATUS

Application filed March 12, 1931. Serial No. 522,093.

My invention relates broadly to sound reproducing systems and more particularly to a system for reproducing sound from an endless film record.

One of the objects of my invention is to provide an arrangement of film apparatus for reproducing sound from a selected sound channel on a multiple sound channel film where the film is in the form of an endless belt.

Another object of my invention is to provide a sound reproducing system employing a sound film which is operated over a multiplicity of guide reels in a manner by which a relatively long continuous film strip may be utilized for passing any one of a multiplicity of sound channels between a light source and a light sensitive cell.

Still another object of my invention is to provide an arrangement of stowage system for an endless film having a multiplicity of sound channels recorded thereon for selectively reproducing sound from any one of the sound channels on the film.

A further object of my invention is to provide a construction of portable sound reproducing apparatus in which an endless film is passed around a stowage system for selectively utilizing any one of a multiplicity of sound channels for controlling the operation of a light sensitive cell.

Other and further objects of my invention reside in the construction of a portable sound producing machine utilizing a film record as set forth more fully in the specification hereinafter following by reference to the accompanying drawing, in which:

Figure 1 is a side elevation of the apparatus embodying my invention; Fig. 2 is a cross-sectional view through the projection lamp housing taken on line 2—2 of Fig. 4; Fig. 3 is an elevational view showing the arrangement of shutter looking in the direction of line 3—3 of Fig. 4; Fig. 4 is a horizontal sectional view taken through the projection lamp housing and light sensitive cell shown in Fig. 1; and Fig. 5 is a fragmentary section of the film record which is employed in the sound reproducing system of my invention.

Referring to the drawing in detail, reference character 1 represents a vertically extending support on which there is journaled a multiplicity of film reels and guides rotatably journaled on horizontal axes. I have designated the sets of reels and guides aligned in different horizontal planes. For example, reels 2, 3, 4 and 5 are disposed along the upper portion of the framework 1, while reels 6, 7, 8 and 9 are disposed along the lower portion of the framework 1. Intermediate sets of reels 10, 11 and 12, and 14, 15 and 16 are disposed in other horizontal planes with respect to the framework 1. The endless film 17 is guided around the several reels in a serpentine or circuitous path as shown and is guided by idler rollers 18 and 19 in a vertical path between the lamp housing and the housing which encloses the light sensitive cell in the arrangement shown. The film strip 17 is driven by sprocket 20 which engages the perforations in the opposite sides of the film and is rotatably driven from the same shaft which carries pulley 21 over which drive belt 22 passes from driving pulley 23 of driving motor 24.

The lamp projector housing is indicated at 25 forming a reflector for lamp 26, the light rays from which pass through lens system 27 and through the light slits 28, 29 and 30 in the front wall of the lamp housing. A shutter 33 having an aperture 34 located therein is adapted to be moved across the front of the lamp housing, said housing having appropriate guides 31a to receive the reduced portion 31 of the shutter. A finger grip 32 provides means for manually shifting the shutter 33 to bring the aperture 34 into register with slits 28, 29 or 30. The photoelectric cell housing is shown at 48 containing photoelectric cell 40 which connects to amplifier 41 having volume control device 42 connected therewith for the reproduction of sound through loud speaker 43. The photoelectric cell can be selectively exposed to light rays from any one of the several channels on the film 17. The photoelectric cell 40 has a photosensitive cathode 40b and an anode 40a. The photoelectric cell housing 48 is provided with slits 35, 36, and 37 which are respectively opposite the slits 28, 29, and 30. Prisms 38 and 39 are provided, within the housing 48, proximate to the slits 35 and 36, respectively. When the shutter 33 is moved into a position such that the aperture 34 registers with the slit 28, light rays from the lamp 26 will be directed by the prism 38 to a predetermined point of the photosensitive cathode of the photoelectric cell 40. When the shutter 33 is moved into an opposite position in which the aperture 34 registers with the slit 30, light rays from the lamp 26 will be directed by the prism 39 to the same point of the cathode of the photoelectric cell. When the shutter 34 is in a central position in which the aperture 34 registers with the slit 29, light rays from the lamp 26 will pass through slit 36 and fall upon the photosensitive cathode of the photoelectric cell 40 at substantially the same point previously mentioned. This arrangement makes it possible for each of the light beams defined by the slits 28, 29 and 30 to fall upon the same part of the cathode of the photoelectric cell 40, thereby bringing about a more constant operation of the same in accordance with the modulation of the intensity of the light beams by the sound channels on the film 17. The beams of light which are defined by the slits 28, 29 and 30 are each substantially smaller in area than the area of the cathode 40b.

In the operation of the portable sound reproducer, the motor drives the film 17 continuously at a predetermined speed whereby the film passes between the source of light and the light sensitive cell for variably modulating the input circuit to the amplifier 41 and correspondingly controlling the loud speaker 43. Any one of the sound records 44, 45 or 46 on film 17 may be played in a repeat process, or the shutter may be shifted from one sound record to another to selectively reproduce sound from one of the sound records. The film 17 may be provided with any number of sound channels in which event a corresponding number of apertures are provided in the lamp housing and in the photoelectric cell casing.

While I have described my invention in one of its preferred embodiments, I desire that it be understood that modifications may be made and that no limitations upon my invention are intended other than are imposed by the scope of the appended claims.

What I claim as new and desire to secure by Letters Patent of the United States is as follows:

1. A film apparatus comprising an optical system, a plurality of reels in rows in echelon, smaller reels in rows in echelon intermediate said first mentioned rows, the reels of said last mentioned rows being individually aligned with said first mentioned reels of the adjacent row, said smaller reels being larger in diameter than the space between adjacent reels in said first mentioned rows, and a film supported by said reels for movement with respect to said optical system, said film extending in loops between adjacent reels in said first mentioned rows around said smaller reels of the furthest row.

2. A film apparatus comprising light projecting means, film reels aligned in rows in echelon, other rows of smaller reels aligned in rows in echelon intermediate said first mentioned rows, the reels of each of said last mentioned rows being individually aligned with the reels of the adjacent row of said first mentioned reels, and a film, said film being supported by said reels for movement with respect to said light projection means and extending around said first mentioned rows of reels with loops drawn in between adjacent ones of said first mentioned reels, said loops extending inwardly towards each other and around said smaller reels of the row adjacent the row of said first mentioned reels opposite said reels from which said loops are drawn.

In testimony whereof I affix my signature.
GORDON BROWN SCHEIBELL.